(12) United States Patent  
Nakagawa et al.

(10) Patent No.: US 10,892,501 B2
(45) Date of Patent: Jan. 12, 2021

(54) FUEL CELL SYSTEM AND METHOD OF OPERATING THE SAME

(71) Applicant: HONDA MOTOR CO., LTD., Tokyo (JP)

(72) Inventors: Takuto Nakagawa, Wako (JP); Kenji Taruya, Wako (JP); Tomohisa Kamiyama, Wako (JP)

(73) Assignee: HONDA MOTOR CO., LTD., Toyota (JP)

( * ) Notice: Subject to any disclaimer, the term of this patent is extended or adjusted under 35 U.S.C. 154(b) by 1063 days.

(21) Appl. No.: 15/379,484

(22) Filed: Dec. 15, 2016

(65) Prior Publication Data
US 2017/0250420 A1 Aug. 31, 2017

(30) Foreign Application Priority Data

Feb. 29, 2016 (JP) .................................. 2016-036963

(51) Int. Cl.
*H01M 8/04746* (2016.01)
*H01M 8/04082* (2016.01)
*H01M 8/04664* (2016.01)
*H01M 8/0438* (2016.01)

(52) U.S. Cl.
CPC ... *H01M 8/04664* (2013.01); *H01M 8/04201* (2013.01); *H01M 8/04388* (2013.01); *H01M 8/04753* (2013.01); *H01M 2250/20* (2013.01)

(58) Field of Classification Search
CPC ......... H01M 8/04664; H01M 8/04201; H01M 8/04388; H01M 8/04753; H01M 2250/20; H01M 8/04679; H01M 8/04097; Y02T 90/32

See application file for complete search history.

(56) References Cited

U.S. PATENT DOCUMENTS

| 2007/0207355 | A1* | 9/2007 | Yoshida | H01M 8/04664 429/444 |
| 2012/0021313 | A1* | 1/2012 | Yasuda | H01M 8/0625 429/416 |
| 2012/0270126 | A1* | 10/2012 | Matsumoto | H01M 8/04679 429/429 |
| 2014/0110185 | A1* | 4/2014 | Naito | H01M 8/04201 180/65.31 |

FOREIGN PATENT DOCUMENTS

| JP | 2002-370544 | 12/2002 |
| JP | 2004-127748 | 4/2004 |
| JP | 2006-236799 | 9/2006 |
| JP | 2011-094652 | 5/2011 |
| WO | WO 2005/078844 | 8/2005 |

OTHER PUBLICATIONS

Japanese Office Action for corresponding JP Application No. 2016-036963, dated Aug. 8, 2017.

\* cited by examiner

*Primary Examiner* — Lisa S Park
(74) *Attorney, Agent, or Firm* — Mori & Ward, LLP

(57) ABSTRACT

A fuel cell system includes a fuel gas leakage sensor provided in a housing chamber to detect leakage of a fuel gas from a fuel cell to an inside of a housing chamber. Circuitry is configured to close at least one of a first valve and a second valve when the fuel gas leakage sensor detects the leakage of the fuel gas. The circuitry is configured to control the fuel cell to generate electric power using the fuel gas in the fuel cell while the at least one of the first valve device and the second valve device is closed when the fuel gas leakage sensor detects the leakage of the fuel gas.

16 Claims, 7 Drawing Sheets

FUEL CELL SYSTEM AND METHOD OF OPERATING THE SAME

CROSS-REFERENCE TO RELATED APPLICATIONS

The present application claims priority under 35 U.S.C. § 119 to Japanese Patent Application No. 2016-036963, filed Feb. 29, 2016, entitled "Fuel Cell System and Method of Operating The Same." The contents of this application are incorporated herein by reference in their entirety.

BACKGROUND

1. Field

The present disclosure relates to a fuel cell system and a method of operating the fuel cell system.

2. Description of the Related Art

For example, Japanese Unexamined Patent Application Publication No. 2011-094652 discloses a fuel cell automobile that prohibits supplying of a fuel gas so as to prohibits starting of the automobile in the case where leakage of the fuel gas is detected in a fuel gas tank, a fuel gas supply channel, or the like when the fuel gas is supplied. Also, Japanese Unexamined Patent Application Publication No. 2002-370544 discloses an electric automobile in which a fuel cell is disposed in a motor room.

SUMMARY

According to one aspect of the present invention, a fuel cell system includes a fuel cell, a fuel gas supply apparatus, an oxidant gas supply apparatus, a fuel gas leakage sensor, and circuitry. The fuel cell is disposed in a housing chamber in a vehicle to generate electric power via an electrochemical reaction between a fuel gas and an oxidant gas. The fuel gas supply apparatus is to supply the fuel gas to the fuel cell. The fuel gas supply apparatus includes a fuel gas tank, a first valve, and a second valve. The fuel gas tank is to store the fuel gas therein. The first valve is provided to the fuel gas tank. The fuel gas supply channel connects the first valve and the fuel cell and the fuel gas is to be supplied from the fuel gas tank to the fuel cell through the fuel gas supply channel. The second valve is provided in the fuel gas supply channel. The oxidant gas supply apparatus is connected to the fuel cell to supply the oxidant gas to the fuel cell. The fuel gas leakage sensor is provided in the housing chamber to detect leakage of the fuel gas from the fuel cell to an inside of the housing chamber. The circuitry is configured to close at least one of the first valve and the second valve when the fuel gas leakage sensor detects the leakage of the fuel gas. The circuitry is configured to control the fuel cell to generate the electric power using the fuel gas in the fuel cell while the at least one of the first valve device and the second valve device is closed when the fuel gas leakage sensor detects the leakage of the fuel gas.

According to another aspect of the present invention, a method of operating a fuel cell system includes detecting leakage of fuel gas from a fuel cell to an inside of a housing chamber. At least one of a first valve and a second valve is closed when the leakage of the fuel gas is detected. The first valve is to control communication between a fuel gas tank in which the fuel gas is stored and a fuel gas supply channel through which the fuel gas to store the fuel gas tank therein. The second valve is provided in the fuel gas supply channel. The fuel cell is controlled to generate power while the at least one of the first valve device and the second valve device is closed when the leakage of the fuel gas is detected.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
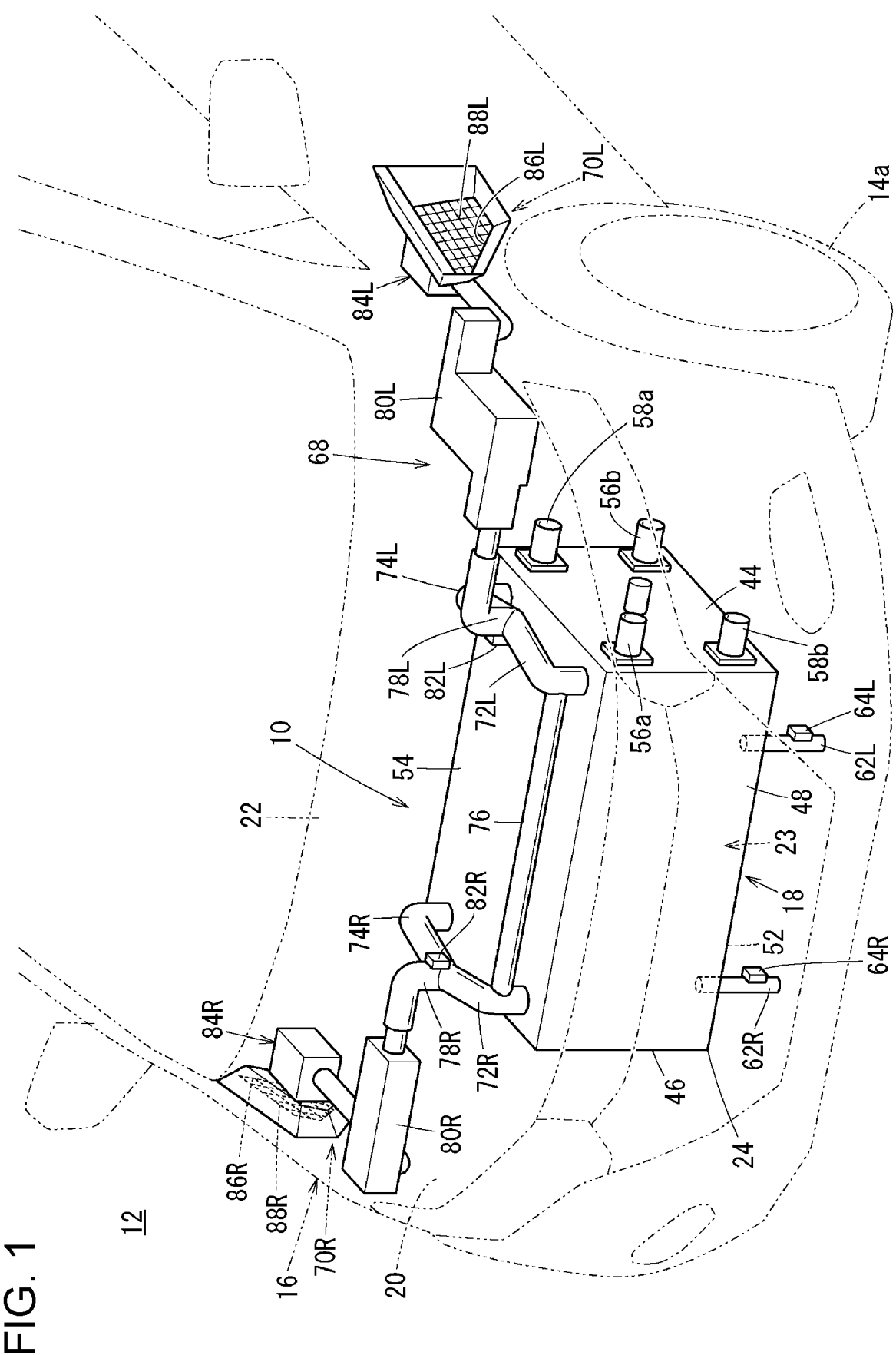
FIG. 1 is a schematic perspective view illustrating a front portion of a fuel cell vehicle in which a fuel cell system according to an embodiment of the present application is installed.

The embodiments will now be described with reference to the accompanying drawings, wherein like reference numerals designate corresponding or identical elements throughout the various drawings.

An embodiment of a fuel cell system and a method of operating the fuel cell system according to the present application will be described with reference to the accompanying drawings.

Figure 2:
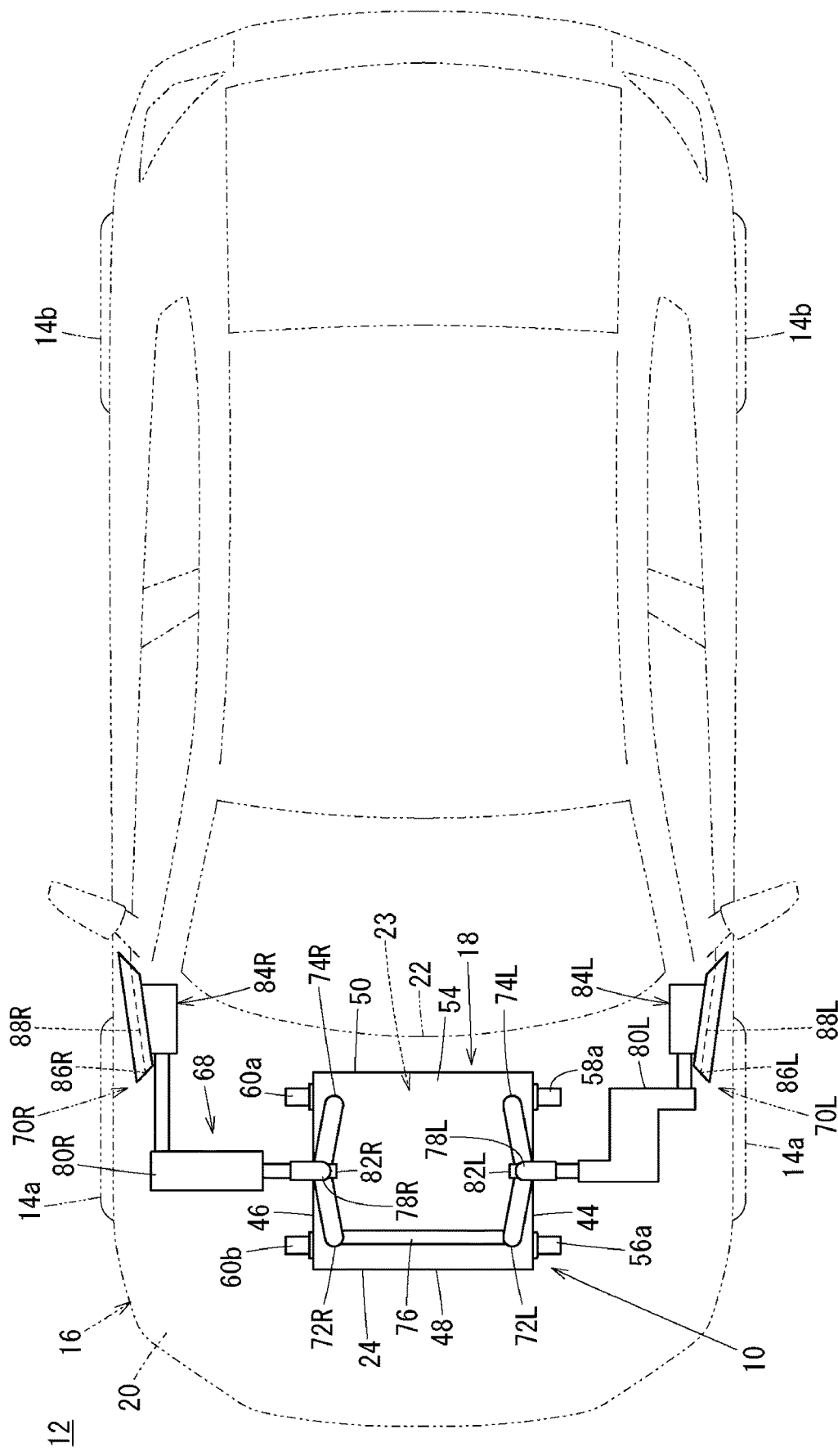
FIG. 2 is a schematic plan view illustrating the fuel cell vehicle of FIG. 1.

As illustrated in FIGS. 1 and 2, a fuel cell system 10 according to the embodiment of the present application is installed in, for example, a fuel cell vehicle (vehicle) 12 such as a fuel cell electric automobile. The fuel cell vehicle 12 includes a vehicle main body 16 that includes front wheels 14a and rear wheels 14b. A motor room (housing chamber) 20 in which a fuel cell stack 18 is installed is formed in front of a dashboard 22 on the front wheels 14a side of the vehicle main body 16.

Figure 3:
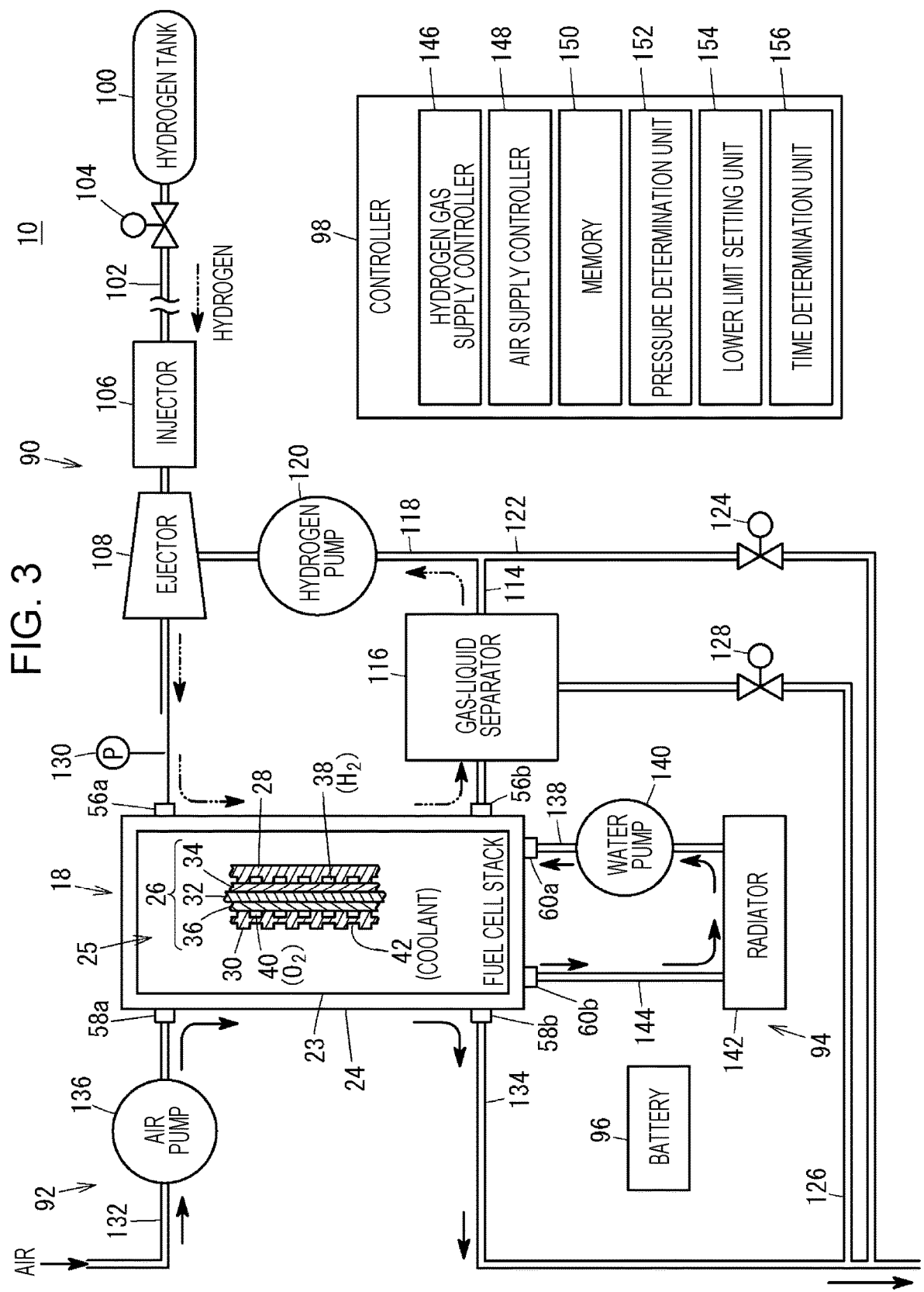
FIG. 3 is a schematic configuration view illustrating the fuel cell system of FIG. 1.

The fuel cell stack 18 includes a fuel cell stack main body 23 and a stack casing 24 that houses the fuel cell stack main body 23. As illustrated in FIG. 3, a plurality of power generating cells 25 are arranged side-by-side in the horizontal direction or one on top of another in the vertical direction in the fuel cell stack main body 23. In the power generating cells 25, membrane electrode assemblies 26 are held between first separators 28 and second separators 30. The first separators 28 and the second separators 30 include metal separators or carbon separators.

The membrane electrode assemblies 26 each include, for example, a solid polymer electrolyte membrane 32 which is a thin film of perfluoro sulfonic acid containing water moisture, an anode electrode 34, and a cathode electrode 36. The solid polymer electrolyte membrane 32 is held between the anode electrode 34 and the cathode electrode 36. Other than a fluorine electrolyte, a hydrocarbon (HC) electrolyte is used for the solid polymer electrolyte membrane 32.

A hydrogen gas channel (fuel gas channel) 38 is provided between each of the first separator 28 and a corresponding one of the membrane electrode assemblies 26. The hydrogen gas is guided to the anode electrode 34 through the hydrogen gas channel 38. An air channel (oxidant gas channel) 40 is provided between each of the second separator 30 and a corresponding one of the membrane electrode assemblies 26. The air is supplied to the cathode electrode 36 through the air channel 40. A coolant channel 42 is provided between each of the first separator 28 and one of the second separators 30 adjacent to the first separator 28. A coolant flows through the coolant channel 42.

As illustrated in FIGS. 1 and 2, the stack casing 24 has a box shape and includes a first end plate 44, a second end plate 46, a front side panel 48, a rear side panel 50, a lower panel 52, and an upper panel 54. The first end plate 44 and the second end plate 46 are provided at both ends in a stack direction of the power generating cells 25.

As illustrated in FIGS. 1 to 3, a hydrogen gas inlet 56a, a hydrogen gas outlet 56b, an air inlet 58a, an air outlet 58b, a coolant inlet 60a, and a coolant outlet 60b are provided in the stack casing 24. For convenience of description, the positional relationships between the hydrogen gas inlet 56a, the hydrogen gas outlet 56b, the air inlet 58a, the air outlet 58b, the coolant inlet 60a, and the coolant outlet 60b in FIG. 3 are changed from those illustrated in FIGS. 1 and 2.

Referring to FIGS. 1 and 2, the hydrogen gas inlet 56a and the hydrogen gas outlet 56b are provided at opposite angle positions of one of the diagonal lines of the first end plate 44. An inner hole of the hydrogen gas inlet 56a communicates with a hydrogen gas inlet manifold (not illustrated) that penetrates through each of the power generating cells 25 in the stack direction and also communicates with a supply side of the hydrogen gas channel 38. An inner hole of the hydrogen gas outlet 56b communicates with a hydrogen gas outlet manifold (not illustrated) that penetrates through each of the power generating cells 25 in the stack direction and also communicates with a discharge side of the hydrogen gas channel 38. An anode channel includes the hydrogen gas channel 38, the hydrogen gas inlet manifold, and the hydrogen gas outlet manifold.

The air inlet 58a and the air outlet 58b are provided at opposite angle positions of the other diagonal lines of the first end plate 44. An inner hole of the air inlet 58a communicates with an air inlet manifold (not illustrated) that penetrates through each of the power generating cells 25 in the stack direction and also communicates with a supply side of the air channel 40. An inner hole of the air outlet 58b communicates with an air outlet manifold (not illustrated) that penetrates through each of the power generating cells 25 in the stack direction and also communicates with a discharge side of the air channel 40. A cathode channel includes the air channel 40, the air inlet manifold, and the air outlet manifold.

Referring to FIG. 2, the coolant inlet 60a and the coolant outlet 60b are provided in the second end plate 46. An inner hole of the coolant inlet 60a communicates with a coolant inlet manifold (not illustrated) that penetrates through each of the power generating cells 25 in the stack direction and also communicates with a supply side of the coolant channel 42. An inner hole of the coolant outlet 60b communicates with a coolant outlet manifold (not illustrated) that penetrates through each of the power generating cells 25 in the stack direction and also communicates with a discharge side of the coolant channel 42.

As illustrated in FIG. 1, a left drain pipe 62L and a right drain pipe 62R that allow water generated when power is generated by the fuel cell stack 18 to be discharged therethrough are connected to the lower panel 52. The left drain pipe 62L and the right drain pipe 62R are provided at front positions of the lower panel 52 in the vehicle front-rear direction and separated from each other in the vehicle width direction. The left drain pipe 62L is provided with a first hydrogen gas sensor 64L and the right drain pipe 62R is provided with a second hydrogen gas sensor 64R. The first hydrogen gas sensor 64L and the second hydrogen gas sensor 64R detect a hydrogen gas leaking from the fuel cell stack 18 (the inside of the stack casing 24) to the inside of the motor room 20. A third hydrogen gas sensor 82L and a fourth hydrogen gas sensor 82R to be described later function in a manner that is the same as or similar to that of the first hydrogen gas sensor 64L and the second hydrogen gas sensor 64R.

Referring to FIGS. 1 and 2, ventilation pipes 68 through which the hydrogen gas having leaked from the fuel cell stack main body 23 to the inside of the stack casing 24 is guided to the outside are connected to the upper panel 54. The ventilation pipes 68 include two or more left pipes, for example, two left pipes 72L and 74L that connect the stack casing 24 to a left fender portion (left side surface) 70L of the vehicle main body 16 to each other. The ventilation pipes 68 also include two or more right pipes, for example, two right pipes 72R and 74R that connect the stack casing 24 to a right fender portion (right side surface) 70R of the vehicle main body 16 to each other. A middle portion of the left pipe 72L and the right pipe 72R are connected to ends of a bypass pipe 76 being independent of the stack casing 24 (exposed on the outside of the stack casing 24).

One end portion of the left pipe 72L and one end portion of the left pipe 74L are connected to the respective left corners of the upper panel 54, and the other end portion of the left pipe 72L and the other end portion of the left pipe 74L are combined with each other at a left combining portion 78L so as to be connected to the left fender portion 70L as a single left discharge duct 80L. The left combining portion 78L is provided with the third hydrogen gas sensor 82L.

One end portion of the right pipe 72R and one end portion of the right pipe 74R are connected to the respective right corners of the upper panel 54, and the other end portion of the right pipe 72R and the other end portion of the right pipe 74R are combined with each other at a right combination portion 78R so as to be connected to the right fender portion 70R as a single right discharge duct 80R. The right combination portion 78R is provided with the fourth hydrogen gas sensor 82R.

A left chamber member 84L is provided in the left fender portion 70L. The left chamber member 84L has an outward opening 86L where a mesh member 88L is provided. A right chamber member 84R is provided in the right fender portion 70R. The right chamber member 84R has an outward opening 86R where a mesh member 88R is provided.

As illustrated in FIG. 3, the fuel cell stack 18 is provided with a fuel gas supply device 90 (a fuel gas supply apparatus 90) that supplies, for example, a hydrogen gas serving as a fuel gas, an oxidant gas supply device 92 that supplies, for example, air serving as an oxidant gas, and a coolant supply device 94 that supplies a coolant. Furthermore, the fuel cell system 10 includes a battery 96 serving as an energy storage device and a controller 98 serving as a system controlling device.

The fuel gas supply device 90 includes a hydrogen tank (fuel gas tank) 100 in which high-pressure hydrogen is stored. The hydrogen tank 100 is connected to the hydrogen gas inlet 56*a* through a hydrogen gas supply channel (fuel gas supply channel) 102. The hydrogen gas supply channel 102 allows the hydrogen gas to be supplied therethrough to the fuel cell stack 18. The hydrogen tank 100 is provided with a stop valve (on-off valve) 104 serving as a first valve device (a first valve) that blocks the communication of the inside of the hydrogen tank 100 with the hydrogen gas supply channel 102.

An injector 106 and an ejector 108 are arranged in series in the hydrogen gas supply channel 102. The injector 106 serves as a valve device (second valve device, second valve) with which the flow rate of the hydrogen gas guided to the fuel cell stack 18 is adjustable.

A hydrogen gas discharge channel (off-gas pipe) 114 is connected to the hydrogen gas outlet 56*b*. The hydrogen gas discharge channel 114 allows a hydrogen exhaust gas (fuel exhaust gas) which is a hydrogen gas at least part of which has been used by the anode electrode 34 to be guided therethrough from the fuel cell stack 18. A gas-liquid separator 116 is connected to the hydrogen gas discharge channel 114 and the ejector 108 is also connected to the hydrogen gas discharge channel 114 through a hydrogen circulation channel (circulation channel) 118 which branches off on the downstream side of the gas-liquid separator 116. A hydrogen pump (circulation pump) 120 is provided in the hydrogen circulation channel 118. The hydrogen pump 120 causes, particularly at the time of starting, the hydrogen exhaust gas discharged to the hydrogen gas discharge channel 114 to circulate in the hydrogen gas supply channel 102 through the hydrogen circulation channel 118.

One end of a purge channel 122 communicates with a downstream portion of the hydrogen gas discharge channel 114, and a purge valve 124 is provided in a middle portion of the purge channel 122. One end of a discharge channel 126 through which a fluid mainly containing liquid components is discharged is connected to a bottom portion of the gas-liquid separator 116. A drain valve 128 is disposed in a middle portion of the discharge channel 126. In order to detect a hydrogen gas pressure (a fuel gas pressure) of the anode channel, the fuel gas supply device 90 includes a pressure sensor (pressure detector) 130 disposed, for example, close to the hydrogen gas inlet 56*a* in the hydrogen gas supply channel 102. A detection signal of this pressure sensor 130 is transmitted to the controller 98.

The oxidant gas supply device 92 includes an air supply channel (oxidant gas supply channel) 132 and an air discharge channel 134. The air supply channel 132 is connected to the air inlet 58*a*. The air discharge channel 134 communicates with the air outlet 58*b*. An air pump (supply pump) 136 that compresses and supplies air from the atmosphere is disposed in a middle portion of the air supply channel 132. The air supply channel 132 allows the air to be guided therethrough to the fuel cell stack 18. The air discharge channel 134 allows exhaust air which is the air at least part of which has been used by the cathode electrode 36 to be discharged therethrough from the fuel cell stack 18.

The coolant supply device 94 includes a coolant supply channel 138 connected to the coolant inlet 60*a*. A water pump 140 is disposed in a middle portion of the coolant supply channel 138. The coolant supply channel 138 is connected to a radiator 142 to which a coolant discharge channel 144 communicating with the coolant outlet 60*b* is connected.

The controller 98 controls the amount of power generated by the fuel cell stack 18 in accordance with the power required for loads. Examples of the loads include, for example, a traction motor (not illustrated), the hydrogen pump 120, and so forth. The loads may also include the air pump 136, the water pump 140, and so forth. Furthermore, the controller 98 limits the amount of the power generated by the fuel cell stack 18 in accordance with the mass flow rate of hydrogen (flow rate of the fuel gas guided to the fuel cell system 10). Detection signals of the first to fourth hydrogen gas sensors 64L, 64R, 82L, and 82R each serving as a fuel gas leakage detector (a fuel gas leakage sensor) are transmitted to the controller 98.

The controller 98 includes a hydrogen gas supply controller (fuel gas supply controller) 146, an air supply controller (oxidant gas supply controller) 148, memory 150, a pressure determination unit 152, a lower limit setting unit 154, and a time determination unit 156.

The hydrogen gas supply controller 146 controls opening and closing of the stop valve 104 and the injector 106. The hydrogen gas supply controller 146 also controls the hydrogen pump 120. The air supply controller 148 controls the air pump 136.

A first pressure threshold P1 and a second pressure threshold P2 are stored in the memory 150. The first pressure threshold P1 is used to determine whether or not to perform fail-safe control. The first pressure threshold P1 is preset in accordance with the capacity of the motor room 20 and a maximum hydrogen holding amount of the fuel cell stack 18. The first pressure threshold P1 reduces as the capacity of the motor room 20 increases or the maximum hydrogen holding amount of the fuel cell stack 18 reduces. The second pressure threshold P2 is set to a pressure value with which leakage of the hydrogen gas from the fuel cell stack 18 to the motor room 20 does not occur and which is smaller than or equal to the first pressure threshold P1.

The pressure determination unit 152 determines whether or not a hydrogen gas pressure P of the anode channel is larger than or equal to the first pressure threshold P1. The pressure determination unit 152 also determines whether or not the hydrogen gas pressure P is smaller than or equal to the second pressure threshold P2. The hydrogen gas pressure P of the anode channel is obtained in accordance with the detection signal of the pressure sensor 130.

The lower limit setting unit 154 sets a lower limit N1 of the number of revolutions of the air pump 136. Here, the lower limit N1 is a number of revolutions of the air pump 136 at which the power generated by the fuel cell system 10 is consumed without charging the battery 96. In other words, the lower limit N1 is a number of revolutions of the air pump 136 at which power consumption is larger than the power generated by the fuel cell system 10. Here, the power consumption includes power consumption of the hydrogen pump 120 and the water pump 140 in addition to power consumption of the air pump 136.

The time determination unit 156 determines whether or not an elapsed time period t from the start of the fail-safe control exceeds a specified determination time period $\Delta t$. The determination time period $\Delta t$ is preset and stored in the memory 150.

Operation of the fuel cell system 10 configured as above is described below.

The hydrogen gas is supplied from the hydrogen tank 100 to the hydrogen gas supply channel 102 in the fuel gas supply device 90 as a result of valve-opening control performed on the stop valve 104 by the hydrogen gas supply controller 146. Furthermore, the hydrogen gas having been supplied to the hydrogen gas supply channel 102 is supplied to the hydrogen gas inlet 56*a* of the fuel cell stack 18 through the injector 106 and the ejector 108 as a result of valve-opening control performed on the injector 106 by the hydrogen gas supply controller 146. The hydrogen gas is guided from the hydrogen gas inlet 56*a* to the hydrogen gas channel 38 and moved along the hydrogen gas channel 38, thereby being supplied to the anode electrode 34 of each of the membrane electrode assemblies 26.

The air is fed to the air supply channel 132 due to a rotational operation of the air pump 136 in the oxidant gas supply device 92 by causing the air pump 136 to drive by the air supply controller 148. This air is supplied to the air inlet 58*a* of the fuel cell stack 18. The air is guided from the air inlet 58*a* to the air channel 40 and moved along the air channel 40, thereby being supplied to the cathode electrode 36 of each of the membrane electrode assemblies 26.

Accordingly, the hydrogen gas supplied to the anode electrode 34 and oxygen in the air supplied to the cathode electrode 36 are consumed due to an electrochemical reaction in an electrode catalyst layer so as to generate power in each of the membrane electrode assemblies 26.

Furthermore, a coolant such as pure water, ethylene glycol, or oil is supplied through the coolant supply channel 138 to the coolant inlet 60*a* of the fuel cell stack 18 due to operation of the water pump 140 in the coolant supply device 94. The coolant flows along the coolant channel 42, cools the power generating cells 25, and then is discharged to the coolant discharge channel 144 through the coolant outlet 60*b*.

Next, the hydrogen gas having been supplied to the anode electrode 34 and partially consumed is discharged as the hydrogen exhaust gas to the hydrogen gas discharge channel 114 through the hydrogen gas outlet 56*b*. The hydrogen exhaust gas is guided from the hydrogen gas discharge channel 114 to the hydrogen circulation channel 118 and caused to circulate in the hydrogen gas supply channel 102 due to a sucking operation of the ejector 108. The hydrogen exhaust gas having been discharged to the hydrogen gas discharge channel 114 is discharged (purged) to the outside due to an opening operation of the purge valve 124 according to need. Likewise, the air having been supplied to the cathode electrode 36 and partially consumed is discharged to the air discharge channel 134 through the air outlet 58*b*.

The hydrogen gas having leaked from the fuel cell stack main body 23 to the inside of the stack casing 24 flows through the ventilation pipe 68 and is smoothly discharged through the outward openings 86L and 86R due to an outside atmosphere flowing in through the left and right drain pipes 62L and 62R in the fuel cell system 10. Thus, the hydrogen gas leaking to the inside of the stack casing 24 can be easily and reliably discharged to the outside of the vehicle main body 16.

In cold climate areas or the like, the outward openings 86L and 86R may be closed due to accumulation of snow on the left and right chamber members 84L and R, adhesion of ice to the left and right chamber members 84L and R, or the like. In such a case, the hydrogen gas having leaked to the inside of the stack casing 24 cannot flow out to the outside through the outward openings 86L and 86R, and accordingly, may leak from the stack casing 24 to the inside of the motor room 20.

Next, a method of operating the fuel cell system 10 in the case where the hydrogen gas leaks from the fuel cell stack 18 to the inside of the motor room 20 is described below with reference to flowcharts of FIGS. 4 and 5.

Figure 4:
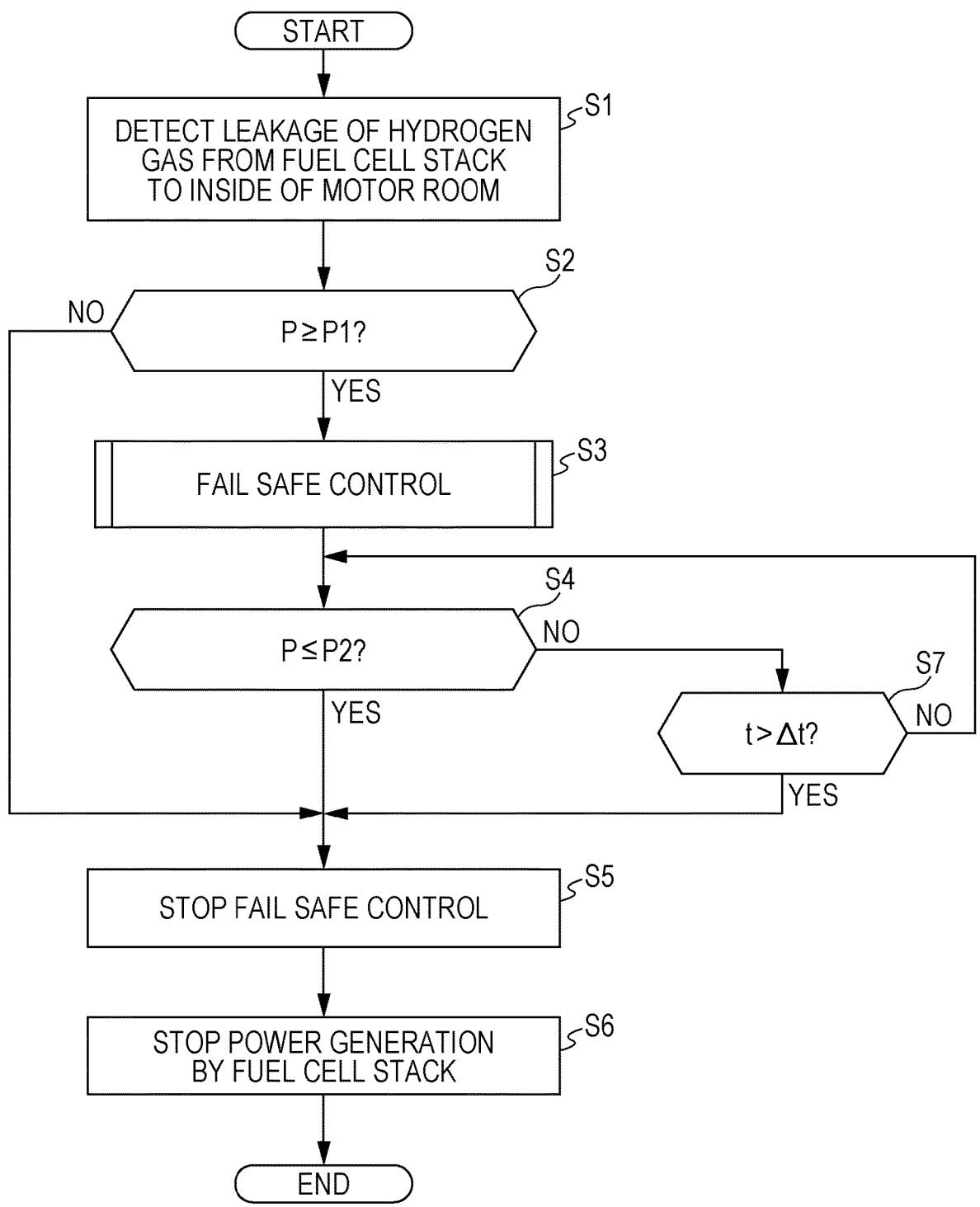
FIG. 4 is a flowchart illustrating a method of operating the fuel cell system.

In step S1 of FIG. 4, the first to fourth hydrogen gas sensors 64L, 64R, 82L, and 82R detect leakage of the hydrogen gas from the fuel cell stack 18 (stack casing 24) to the inside of the motor room 20 (step of detecting leakage of fuel gas). According to the present embodiment, the left drain pipe 62L is provided with the first hydrogen gas sensor 64L, the right drain pipe 62R is provided with the second hydrogen gas sensor 64R, the left combining portion 78L is provided with the third hydrogen gas sensor 82L, and the right combination portion 78R is provided with the fourth hydrogen gas sensor 82R.

That is, the first hydrogen gas sensor 64L and the second hydrogen gas sensor 64R are spaced from each other in the vehicle width direction (on the left and right) below the stack casing 24, and the third hydrogen gas sensor 82L and the fourth hydrogen gas sensor 82R are spaced from each other in the vehicle width direction (on the left and right) above the stack casing 24. Thus, the leakage of the hydrogen gas from the stack casing 24 to the inside of the motor room 20 can be efficiently detected by the first to fourth hydrogen gas sensors 64L, 64R, 82L, and 82R. Furthermore, in this case, whether leakage of the hydrogen gas in the motor room 20 is detected by the first to fourth hydrogen gas sensors 64L, 64R, 82L, and 82R or leakage of the hydrogen gas near the hydrogen tank 100 is detected by a hydrogen gas sensor (not illustrated) disposed near the hydrogen tank 100 can be easily reliably distinguished.

Next, in step S2, the pressure determination unit 152 determines whether or not the hydrogen gas pressure P of the anode channel is larger than or equal to the first pressure threshold P1 (first step of determining a pressure). If the hydrogen gas pressure P is larger than or equal to the first pressure threshold P1, the fail-safe control is performed in step S3. Also at this time, the controller 98 measures the elapsed time period t from the a point in time (point in time t1) at which it is determined by the pressure determination unit 152 that the hydrogen gas pressure P is larger than or equal to the first pressure threshold P1.

Figure 5:
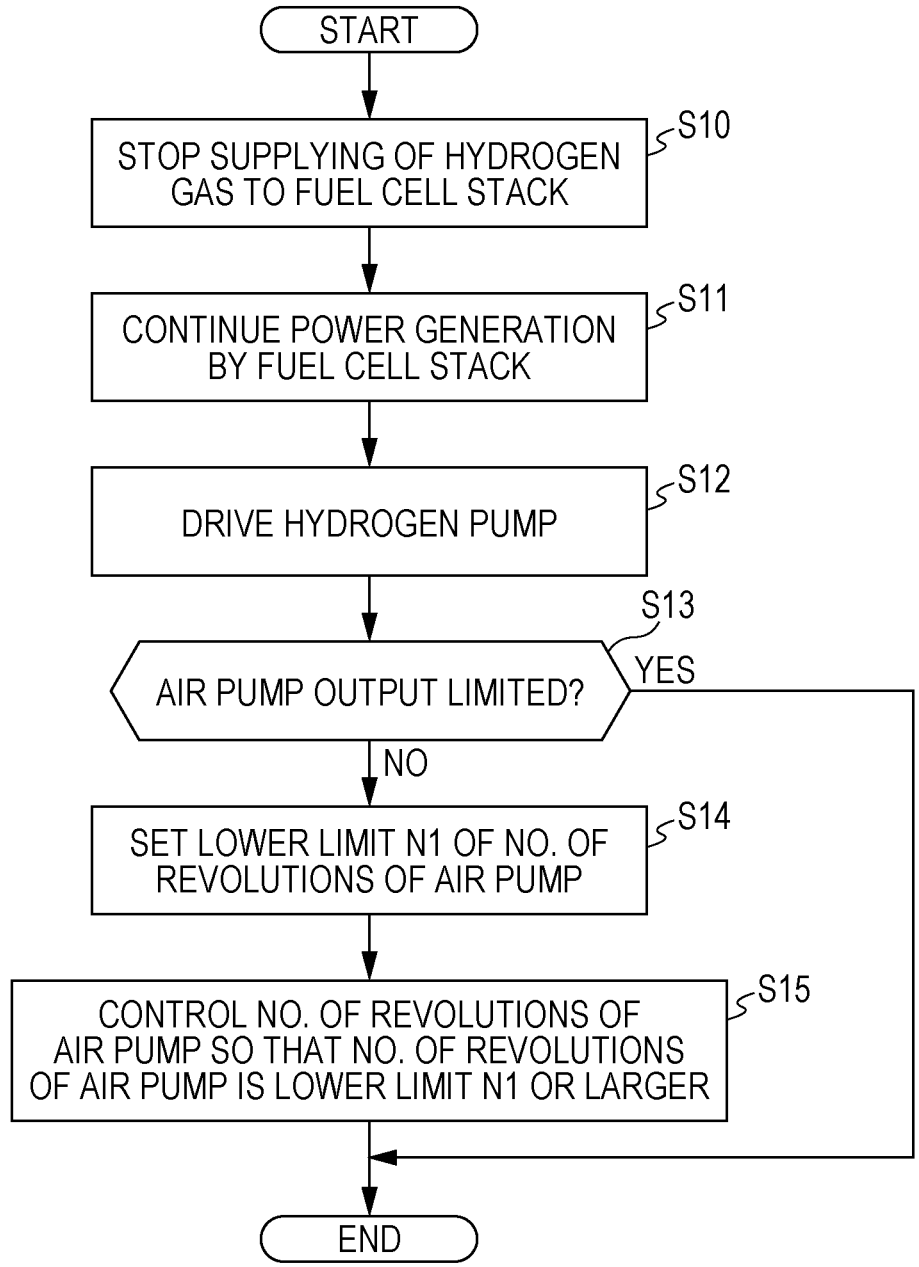
FIG. 5 is a flowchart illustrating fail-safe control of FIG. 4.

In this fail-safe control, step S10 to Step S15 of FIG. 5 are performed. That is, in step S10 (step of performing valve control), supplying of the hydrogen gas from the hydrogen tank 100 to the hydrogen gas supply channel 102 is stopped as a result of the valve-closing control performed on the stop valve 104 by the hydrogen gas supply controller 146. Furthermore, supplying of the hydrogen gas existing between the injector 106 and the hydrogen tank 100 (stop valve 104) in the hydrogen gas supply channel 102 to the fuel cell system 10 is stopped as a result of valve-closing control on the injector 106 performed by the hydrogen gas supply controller 146.

Thus, supplying of a new fuel gas to the fuel cell stack 18 can be stopped. Accordingly, an increase in the amount of the hydrogen gas in the fuel cell stack 18 can be suppressed. In the above-described valve control step, the hydrogen gas supply controller 146 may perform the valve-closing control on one of the stop valve 104 and the injector 106. Even in this case, supplying of the new fuel gas to the fuel cell stack 18 can be stopped. That is, it is sufficient that the hydrogen gas supply controller 146 perform the valve-closing control on at least one of the stop valve 104 and the injector 106 in the valve control step. When the valve control step is performed, the hydrogen gas pressure P of the anode channel reduces over time (see FIG. 6).

Next, in step S11, the fuel cell stack 18 continues to generate the power while valve-closing control on the stop valve 104 and the injector 106 is performed (step of continuing to generate the power). Thus, the hydrogen gas in the fuel cell stack 18 can be consumed due to the power consumption, and accordingly, the amount of the hydrogen gas leaking from the fuel cell stack 18 to the inside of the motor room 20 can be reduced. This can prevent the concentration of the hydrogen gas in the motor room 20 from exceeding an allowable concentration.

Furthermore, in this step of continuing to generate the power, the controller 98 removes the limitation in accordance with the mass flow rate of hydrogen on the amount of the power generated by the fuel cell stack 18. This allows the hydrogen gas in the fuel cell stack 18 to be quickly consumed, and accordingly, the amount of the hydrogen gas leaking from the fuel cell stack 18 to the inside of the motor room 20 can be efficiently reduced.

Next, in step S12, the hydrogen gas supply controller 146 causes the hydrogen pump 120 to drive (step of driving a pump). When the hydrogen pump 120 is driven, the hydrogen exhaust gas which is the hydrogen gas having been used by the fuel cell stack 18 flows back to a hydrogen supply channel. Accordingly, a circulating amount of the hydrogen gas for the fuel cell stack 18 can be ensured. Furthermore, driving the hydrogen pump 120 needs the power. Accordingly, the hydrogen pump 120 can be used as a load of the power generation performed by the fuel cell system 10. Thus, the fuel cell stack 18 can reliably continue to generate the power.

Then, in step S13, the controller 98 determines whether or not output of the air pump 136 is limited. The output of the air pump 136 may be limited in the case where, for example, fail-safe control of the air pump 136 is performed due to the occurrence of an abnormal condition in the air pump 136. The output of the air pump 136 may also be limited in the case where, for example, fail-safe control of the air supply controller 148 is performed due to the occurrence of an abnormal condition in the air supply controller 148 that controls the air pump 136. When the output of the air pump 136 is limited ("YES" in step S13) as described above, precedence is given to the output limitation of the air pump 136. Thus, processing in step S13 is terminated without setting the lower limit N1 of the number of revolutions of the air pump 136.

In contrast, when the output of the air pump 136 is not limited ("NO" in step S13), the lower limit setting unit 154 sets the lower limit N1 of the number of revolutions of the air pump 136 in step S14 (step of setting a lower limit). Then, in step S15, the air supply controller 148 controls the number of revolutions of the air pump 136 to be larger than or equal to the lower limit N1 (step of controlling the number of revolutions).

Figure 6:
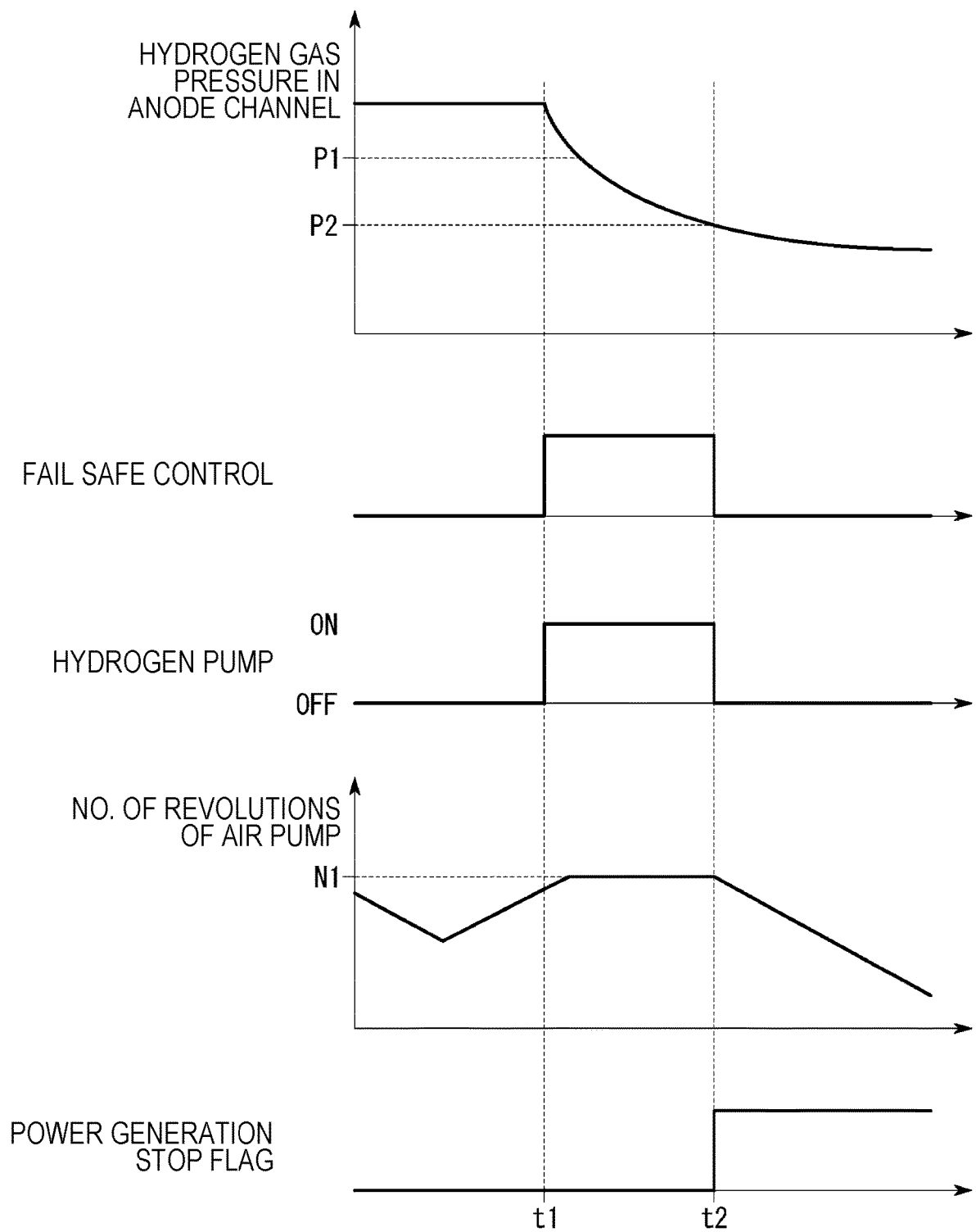
FIG. 6 is a first timing chart illustrating the fail-safe control.

Specifically, in the case where the number of revolutions corresponding to the output current value of the fuel cell stack 18 (normal number of revolutions) is larger than or equal to the lower limit N1, the air supply controller 148 causes the air pump 136 to rotate at the normal number of revolutions, and in the case where the normal number of revolutions is smaller than the lower limit N1, the air supply controller 148 causes the air pump 136 to rotate at the lower limit N1 (see FIG. 6). Thus, a load that consumes the power generated by the fuel cell system 10 can be reliably ensured with the air pump 136, and accordingly, the fuel cell system 10 can preferably continue to generate the power.

After processing in step S15 has been performed, the pressure determination unit 152 determines whether or not the hydrogen gas pressure P of the anode channel is smaller than or equal to the second pressure threshold P2 in step S4 of FIG. 4 (second step of determining a pressure). If the pressure determination unit 152 determines that the hydrogen gas pressure P is smaller than or equal to the second pressure threshold P2, the controller 98 stops the fail-safe control (step S5) and causes the fuel cell stack 18 to stop generating the power (step S6). Specifically, at a point in time t2 of FIG. 6, the hydrogen gas supply controller 146 causes the hydrogen pump 120 to stop driving, the air supply controller 148 causes the air pump 136 to stop driving, and the controller 98 stops the fail-safe control and sets a flag of stopping of the power generation performed by the fuel cell stack 18.

As described above, when the hydrogen gas pressure P is reduced to a pressure with which leakage of the hydrogen gas from the fuel cell stack 18 (inside the stack casing 24) to the motor room 20 does not occur, the fuel cell stack 18 stops generating the power. Thus, the power generation by the fuel cell stack 18 with insufficient hydrogen gas can be suppressed. This can suppress degradation of the fuel cell stack 18.

In contrast, if the pressure determination unit 152 determines that the hydrogen gas pressure P is not smaller than or equal to the second pressure threshold P2 in step S4, the time determination unit 156 determines whether or not the elapsed time period t from the point in time t1 exceeds the determination time period Δt in step S7. If the time determination unit 156 determines that the elapsed time period t does not exceed the determination time period Δt, processing from step S4 is performed.

Figure 7:
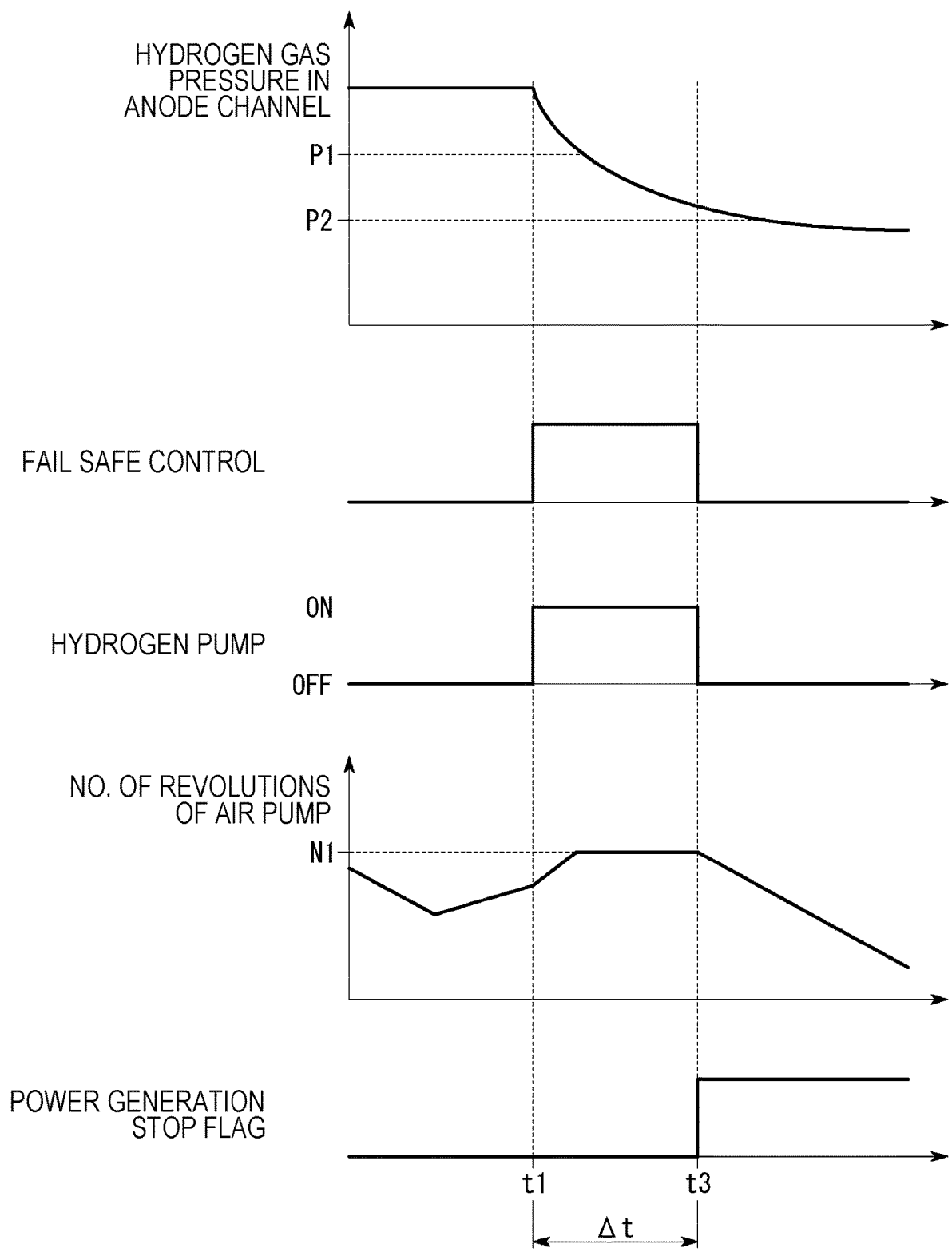
FIG. 7 is a second timing chart illustrating the fail-safe control.

If the time determination unit 156 determines that the elapsed time period t exceeds the determination time period Δt, the controller 98 stops the fail-safe control and causes the fuel cell stack 18 to stop generating the power (see step S5, step S6, and a point in time t3 of FIG. 7). Thus, even in the case where, for example, a considerable time period is required to change the hydrogen gas pressure P to a pressure smaller than or equal to the second pressure threshold P2 and different control for the fuel cell vehicle 12 is stopped by performing the above-described fail-safe control, the different control can be performed by stopping the fail-safe control.

According to the present embodiment, when the hydrogen gas pressure P of the anode channel is larger than or equal to the first pressure threshold P1, the fail-safe control is performed, and the fuel cell stack 18 continues to generate the power until the hydrogen gas pressure P becomes smaller than or equal to the second pressure threshold P2. Accordingly, the amount of the hydrogen gas leaking from the fuel cell stack 18 to the inside of the motor room 20 can be reliably reduced.

The configuration of the fuel cell system 10 according to the present embodiment is not limited to the above-described configuration. The fuel cell stack 18 of the fuel cell system 10 is not necessarily disposed in the motor room 20 of the fuel cell vehicle 12. The fuel cell stack 18 may be disposed in a housing chamber provided at a position such as a rear portion of the vehicle main body 16 or a position under a seat of the fuel cell vehicle 12. Furthermore, the first hydrogen gas sensor 64L and the second hydrogen gas sensor 64R may be omitted. In this case, the third hydrogen gas sensor 82L and the fourth hydrogen gas sensor 82R each function as the fuel gas leakage detector that detect leakage of the hydrogen gas from the fuel cell stack 18 to the inside of the motor room 20 (housing chamber).

With the method of operating the fuel cell system 10 according to the present embodiment, the processing advances by following the flowcharts of FIGS. 4 and 5 even when, for example, an ignition switch (IG) is turned off after leakage of the hydrogen gas from the fuel cell stack 18 to the inside of the motor room 20 has been detected (after step S1). Furthermore, the first pressure threshold P1 and the second pressure threshold P2 may be set to the same value.

Of course, the fuel cell system and the method of operating the fuel cell system according to the present application are not limited to the above-described embodiment, and a variety of configurations can be adopted for the fuel cell system and the method of operating the fuel cell system according to the present application without departing from the gist of the present application.

A fuel cell system according to a first aspect of the present application includes a fuel cell that is disposed in a housing chamber of a vehicle and that generates power by using an electrochemical reaction between a fuel gas and an oxidant gas, a fuel gas supply device that supplies the fuel gas to the fuel cell, and an oxidant gas supply device that supplies the oxidant gas to the fuel cell. The fuel gas supply device includes a fuel gas tank in which the fuel gas is stored, a fuel gas supply channel through which the fuel gas in the fuel gas tank is guided to the fuel cell, a first valve device that blocks communication of an inside of the fuel gas tank with the fuel gas supply channel, and a second valve device provided in the fuel gas supply channel. The fuel cell system further includes a fuel gas leakage detector that detects leakage of the fuel gas from the fuel cell to an inside of the housing chamber, a fuel gas supply controller that performs valve-closing control on at least one of the first valve device and the second valve device when the fuel gas leakage detector detects the leakage of the fuel gas, and a controller that causes the fuel cell to continue to generate the power while the fuel gas supply controller is performing the valve-closing control on the at least one of the first valve device and the second valve device.

With the fuel cell system according to the first aspect of the present application for which the above-described configuration is adopted, the fuel gas in the fuel cell can be consumed by generating the power while an increase in the amount of the fuel gas in the fuel cell caused by the fuel gas supply device is suppressed. Thus, the amount of the fuel gas leaking from the fuel cell to the inside of the housing chamber can be reduced, and accordingly, the concentration of the fuel gas in the housing chamber can be prevented from exceeding an allowable concentration.

In the above-described fuel cell system, the fuel gas supply device may include a circulation channel through which a fuel exhaust gas which is the fuel gas having been used and discharged from the fuel cell is guided to the fuel gas supply channel, and a circulation pump that feeds the fuel exhaust gas to the fuel gas supply channel. In this case, the fuel gas supply controller causes the circulation pump to drive when the fuel gas leakage detector detects the leakage of the fuel gas.

With the above-described configuration, a circulating amount of the fuel gas for the fuel cell can be ensured by driving the circulation pump. Thus, the fuel cell can reliably continue to generate the power.

In the above-described fuel cell system, when the fuel gas leakage detector does not detect the leakage of the fuel gas, the controller may limit in accordance with a flow rate of the fuel gas guided from the fuel gas supply device to the fuel cell an amount of the power generated by the fuel cell, and when the fuel gas leakage detector detects the leakage of the fuel gas, the controller may remove the limitation in accordance with the flow rate of the fuel gas guided from the fuel gas supply device to the fuel cell on the amount of the power generated by the fuel cell.

With the above-described configuration, the amount of the power generated by the fuel cell is not limited, and accordingly, the fuel gas in the fuel cell can be quickly consumed. Thus, the amount of the fuel gas leaking from the fuel cell to the inside of the housing chamber can be efficiently reduced.

The above-described fuel cell system may further include a pressure detector that detects a pressure in an anode channel of the fuel cell. In this case, the controller causes the fuel cell to continue to generate the power when the pressure detected by the pressure detector is larger than or equal to a threshold.

With the above-described configuration, the fuel cell continues to generate the power when the pressure in the anode channel is larger than or equal to a threshold. Thus, the concentration of the fuel gas in the housing chamber can be reliably prevented from exceeding the allowable concentration.

In the above-described fuel cell system, the oxidant gas supply device may include an oxidant gas supply channel through which the oxidant gas is guided to the fuel cell and a supply pump that feeds the oxidant gas to the fuel cell through the oxidant gas supply channel. In this case, the fuel cell system further includes a lower limit setting unit that sets a number of revolutions of the supply pump at which power consumption is larger than the power generated by the fuel cell as a lower limit and an oxidant gas supply controller that controls the number of revolutions of the supply pump so that the number of revolutions of the supply pump is larger than or equal to the lower limit.

With the above-described configuration, a load that consumes the power generated by the fuel cell can be reliably ensured with the supply pump, and accordingly, the fuel cell can preferably continue to generate the power.

In the above-described fuel cell system, the housing chamber may be a motor room of the vehicle.

In a method of operating a fuel cell system according to a second aspect of the present application, a fuel cell system includes a fuel cell that is disposed in a housing chamber of a vehicle and that generates power by using an electrochemical reaction between a fuel gas and an oxidant gas, a fuel gas supply device that supplies the fuel gas to the fuel cell, and an oxidant gas supply device that supplies the oxidant gas to the fuel cell. The fuel gas supply device includes a fuel gas tank in which the fuel gas is stored, a fuel gas supply channel through which the fuel gas in the fuel gas tank is guided to the fuel cell, a first valve device that blocks communication of an inside of the fuel gas tank with the fuel gas supply channel, and a second valve device provided in the fuel gas supply channel. The method includes the steps of detecting leakage of the fuel gas from the fuel cell to an inside of the housing chamber, performing valve control in which valve-closing control is performed on at least one of the first valve device and the second valve device when the detecting of the leakage of the fuel gas detects the leakage of the fuel gas, and continuing to generate the power with the fuel cell while performing the valve-closing control on the at least one of the first valve device and the second valve device by the performing of the valve control.

With the above-described method of operating the fuel cell system, the operating effects that are the same as or similar to those produced by the above-described fuel cell system can be produced. This is similarly applied to the method of operating the fuel cell system described below.

In the above-described method, the fuel gas supply device may further include a circulation channel through which a fuel exhaust gas which is the fuel gas having been used and discharged from the fuel cell is guided to the fuel gas supply channel and a circulation pump that feeds the fuel exhaust gas to the fuel gas supply channel. The method may further include the step of driving the circulation pump when the detecting of the leakage of the fuel gas detects the leakage of the fuel gas.

In the above-described method, when the detecting of the leakage of the fuel gas does not detect the leakage of the fuel gas, an amount of the power generated by the fuel cell may be limited in accordance with a flow rate of the fuel gas guided from the fuel gas supply device to the fuel cell, and in the continuing to generate the power, the limitation in accordance with the flow rate of the fuel gas guided from the fuel gas supply device to the fuel cell on the amount of the power generated by the fuel cell may be removed.

The above-described method may further include the step of determining whether or not a fuel gas pressure in an anode channel of the fuel cell is larger than or equal to a threshold. In this case, in the continuing to generate the power, the fuel cell continues to generate the power when the determining of the fuel gas pressure determines that the fuel gas pressure is larger than or equal to a threshold.

In the above-described method, the oxidant gas supply device may include an oxidant gas supply channel through which the oxidant gas is guided to the fuel cell and a supply pump that feeds the oxidant gas to the fuel cell through the oxidant gas supply channel. In this case, the method further includes the steps of setting a lower limit in which a number of revolutions of the supply pump at which power consumption is larger than the power generated by the fuel cell in the continuing to generate the power is set as the lower limit and controlling the number of revolutions in which the number of revolutions of the supply pump is controlled so that the number of revolutions of the supply pump is larger than or equal to the lower limit set in the setting of the lower limit.

According to the present application, when the fuel gas detector detects the leakage of the fuel gas, the fuel cell continues to generate the power while the valve-closing control is performed on the at least one of the first valve device and the second valve device. Thus, the amount of the fuel gas leaking from the fuel cell to the inside of the housing chamber can be reduced, and accordingly, the concentration of the fuel gas in the housing chamber can be prevented from exceeding the allowable concentration.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell system comprising:
a fuel cell to generate electric power via an electrochemical reaction between a fuel gas and an oxidant gas;
a stack casing housing the fuel cell and disposed in a housing chamber in a vehicle;
a ventilation pipe which is connected to the stack casing and via which the fuel gas inside the stack casing is discharged;
a drain pipe which is connected to the stack casing and via which water generated by the fuel cell is discharged;
a fuel gas supply apparatus to supply the fuel gas to the fuel cell, the fuel gas supply apparatus comprising:
a fuel gas tank to store the fuel gas therein;
a first valve provided to the fuel gas tank;
a fuel gas supply channel which connects the fuel gas tank and the fuel cell and through which the fuel gas in the fuel gas tank is supplied to the fuel cell; and
a second valve provided in the fuel gas supply channel;
an oxidant gas supply apparatus connected to the fuel cell to supply the oxidant gas to the fuel cell;
fuel gas leakage sensors, the ventilation pipe and the drain pipe being provided with the fuel gas leakage sensors to detect leakage of the fuel gas from the fuel cell to an inside of the housing chamber; and
circuitry that:
closes at least one of the first valve and the second valve when at least one of the fuel gas leakage sensors detects the leakage of the fuel gas; and
controls the fuel cell to generate the electric power using the fuel gas in the fuel cell while the at least one of the first valve and the second valve is closed when the at least one of the fuel gas leakage sensors detects the leakage of the fuel gas.

2. The fuel cell system according to claim 1,
wherein the fuel gas supply apparatus further comprises
a circulation channel through which a fuel exhaust gas which has been used and discharged from the fuel cell is supplied to the fuel gas supply channel, and
a circulation pump to feed the fuel exhaust gas to the fuel gas supply channel, and
wherein the circuitry drives the circulation pump when the at least one of the fuel gas leakage sensors detects the leakage of the fuel gas.

3. The fuel cell system according to claim 1,
wherein, when the at least one of the fuel gas leakage sensors does not detect the leakage of the fuel gas, the circuitry controls the fuel cell to generate an amount of the power within a limit corresponding to a flow rate of the fuel gas supplied from the fuel gas supply apparatus to the fuel cell, and
wherein, when the at least one of the fuel gas leakage sensors detects the leakage of the fuel gas, the circuitry controls the fuel cell to generate the amount of the power without the limit.

4. The fuel cell system according to claim 1, further comprising:
a pressure sensor to detect a pressure in an anode channel of the fuel cell,
wherein the circuitry controls the fuel cell to continue to generate the power when the pressure detected by the pressure sensor is larger than or equal to a threshold.

5. The fuel cell system according to claim 1,
wherein the oxidant gas supply apparatus includes
an oxidant gas supply channel through which the oxidant gas is supplied to the fuel cell, and
a supply pump to feed the oxidant gas to the fuel cell through the oxidant gas supply channel, and
wherein the circuitry is further configured to set a revolution speed of the supply pump at which power consumption is larger than the power generated by the fuel cell as a lower limit to control the supply pump such that the revolution speed of the supply pump is larger than or equal to the lower limit.

6. The fuel cell system according to claim 1,
wherein the housing chamber is a motor room in the vehicle.

7. A method of operating the fuel cell system according to claim 1, the method comprising:
detecting leakage of fuel gas from the fuel cell to the inside of the housing chamber;
closing at least one of the first valve and the second valve when the leakage of the fuel gas is detected, the first valve being to control communication between the fuel gas tank to store the fuel gas therein and the fuel gas supply channel through which the fuel gas is to be supplied from the fuel gas tank to the fuel cell, the second valve being provided in the fuel gas supply channel; and controlling the fuel cell to generate power while the at least one of the first valve and the second valve is closed when the leakage of the fuel gas is detected.

8. The method according to claim 7, further comprising:
driving a circulation pump to feed a fuel exhausted gas which has been used and discharged from the fuel cell via a circulation channel which is connected to the fuel gas supply channel when the leakage of the fuel gas is detected.

9. The method according to claim 7, further comprising:
controlling the fuel cell to generate an amount of the power within a limit corresponding to a flow rate of the fuel gas supplied from the fuel gas supply apparatus to the fuel cell, and controlling the fuel cell to generate the amount of the power without the limit.

10. The method according to claim 7, further comprising:
determining whether or not a fuel gas pressure in an anode channel of the fuel cell is larger than or equal to a threshold, controlling the fuel cell to continue to generate the power when it is determined that the fuel gas pressure is larger than or equal to the threshold while the at least one of the first valve and the second valve is closed.

11. The method according to claim 7,
setting, as a lower limit, a revolution speed of a supply pump at which power consumption is larger than the power which the fuel cell is controlled to continue to generate, the supply pump being to feed an oxidant gas to the fuel cell; and controlling the supply pump such that the revolution speed of the supply pump is larger than or equal to the lower limit.

12. The fuel cell system according to claim 1,
wherein the circuitry that performs a fail-safe control when a fuel gas pressure in the fuel gas supply channel is more than or equal to a first pressure threshold, and wherein the fail-safe control includes:
valve-closing control performed on the first valve to stop supplying of the fuel gas to the fuel gas supply channel; and output-limitation of a supply pump of the oxidant gas supply apparatus, when an abnormal condition occurs in the supply pump.

13. The fuel cell system according to claim 12,
wherein the circuitry stops the fail-safe control when the fuel gas pressure in the fuel gas supply channel is less than or equal to a second pressure threshold.

14. The fuel cell system according to claim 13,
wherein the supply pump is rotated at a lower limit speed when the abnormal condition does not occur.

15. The fuel cell system according to claim 13,
wherein the first pressure threshold is preset in accordance with a capacity of the housing chamber and a maximum hydrogen holding amount of a fuel cell stack including a fuel cell stack main body and the stack casing that houses the fuel cell stack main body.

16. The fuel cell system according to claim 15,
wherein the second pressure threshold is set to a pressure value with which leakage of the fuel gas from the fuel cell stack to the housing chamber does not occur and which is smaller than or equal to the first pressure threshold.

* * * * *